(12) United States Patent
Coha et al.

(10) Patent No.: US 6,553,973 B1
(45) Date of Patent: Apr. 29, 2003

(54) FUEL TANK COVER AND FILTER ASSEMBLY FOR FUEL TANK

(75) Inventors: Timothy Francis Coha, Luxembourg (LU); Jill Marie Coha, Luxembourg (LU); Gregory Thomas Roth, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/578,308

(22) Filed: May 25, 2000

(51) Int. Cl.⁷ .............................................. F08M 37/04
(52) U.S. Cl. ....................... 123/509; 123/510; 137/265; 137/565.33
(58) Field of Search ................................. 123/510, 509, 123/514, 457; 137/565.34, 265, 565.22, 565.33, 574

(56) References Cited

U.S. PATENT DOCUMENTS

| | | | | |
|---|---|---|---|---|
| 5,341,773 A | * | 8/1994 | Schulte et al. ......... | 123/184.61 |
| 5,649,514 A | * | 7/1997 | Okada et al. ............... | 123/514 |
| 5,769,061 A | * | 6/1998 | Nagata et al. .............. | 123/509 |
| 5,782,223 A | * | 7/1998 | Yamashita et al. .......... | 123/510 |
| 6,106,244 A | * | 8/2000 | Nakatsukasa et al. ....... | 417/313 |
| 6,142,126 A | * | 11/2000 | Kanamura .................. | 123/509 |
| 6,155,238 A | * | 12/2000 | Briggs et al. ............... | 123/509 |
| 6,276,342 B1 | * | 8/2001 | Sinz et al. .................. | 123/514 |
| 6,283,142 B1 | * | 9/2001 | Wheeler et al. ............. | 137/265 |
| 6,308,733 B2 | * | 10/2001 | Murakoshi et al. .... | 137/565.34 |
| 6,371,153 B1 | * | 4/2002 | Fischerkeller et al. ...... | 137/265 |

* cited by examiner

*Primary Examiner*—Carl S. Miller
(74) *Attorney, Agent, or Firm*—Vincent A. Cichosz

(57) ABSTRACT

A fuel tank cover assembly for a fuel tank of a vehicle includes a cover adapted to close an opening in the fuel tank having a fuel reservoir disposed therein and a fuel filter disposed within and attached directly to the cover to filter fuel from the fuel tank to an engine of the vehicle.

16 Claims, 3 Drawing Sheets

FUEL TANK COVER AND FILTER ASSEMBLY FOR FUEL TANK

TECHNICAL FIELD

The present invention relates generally to fuel tanks for vehicles and, more particularly, to a fuel tank cover and filter assembly for a fuel tank of a vehicle.

BACKGROUND OF THE INVENTION

It is known to provide a fuel tank such as a plastic fuel tank in a vehicle to hold fuel to be used by an engine of the vehicle. In such a fuel tank, a cover is provided for a fuel reservoir. The cover typically has fuel tubes, electrical connector, and rollover valve attached thereto.

It is also known to provide a fuel filter to filter the fuel from the fuel tank to the engine. Typically, the fuel filter is connected to the fuel line that delivers fuel to the engine. The fuel filter is located outside the fuel tank under a vehicle body of the vehicle.

One concern is that "demand" fuel systems are being introduced to eliminate return of hot fuel from the engine to the fuel tank, thereby eliminating an engine fuel return line. However, the fuel must still be filtered in the fuel line prior to being sent to the engine and current fuel systems require a bypass from the fuel filter back into the fuel tank in order to keep the pressure regulated. With the current in-line fuel filter, a partial return line is still required which forces an extra connection at a fuel tank cover.

Therefore, it is desirable to provide a fuel tank cover and fuel filter assembly for a vehicle that incorporates the function of the in-line fuel filter into a fuel tank cover to eliminate several connections and simplify the fuel system. It is also desirable to provide a fuel tank cover and fuel filter assembly that eliminates a return line and a connection at the cover for a fuel tank.

SUMMARY OF THE INVENTION

It is, therefore, one object of the present invention to provide a new fuel tank cover and fuel filter assembly for a fuel tank of a vehicle.

It is another object of the present invention to provide a fuel tank cover and fuel filter assembly with a separate cover and a fuel filter attached to the cover.

To achieve the foregoing objects, the present invention is a fuel tank cover and fuel filter assembly for a fuel tank of a vehicle including a cover for a fuel reservoir disposed in the fuel tank and a fuel filter attached directly to the cover to filter fuel from the fuel reservoir.

One advantage of the present invention is that a fuel tank cover and fuel filter assembly is provided for fuel tank of a vehicle that incorporates the function of the in-line filter into the fuel tank cover to eliminate several connections and simplify the fuel system and assembly process. Another advantage of the present invention is that the fuel tank cover and fuel filter assembly incorporates the fuel filter into the fuel tank cover by spin-welding the fuel filter directly to the cover. Yet another advantage of the present invention is that the fuel tank cover and fuel filter assembly regulates and filters fuel inside the fuel tank, thus eliminating a return line and connection at the cover. Still another advantage of the present invention is that the fuel tank cover and fuel filter assembly eliminates two connections in the fuel line where the fuel filter was previously attached. A further advantage of the present invention is that the fuel tank cover and fuel filter assembly significantly reduces the number of components to obtain the desired function and reduces the number of seals and permeation by incorporating the fuel filter into the cover for the fuel reservoir. Yet a further advantage of the present invention is that the fuel tank cover and fuel filter assembly enhances impact worthiness with the elimination of an external filter and one connector for the fuel tank cover.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
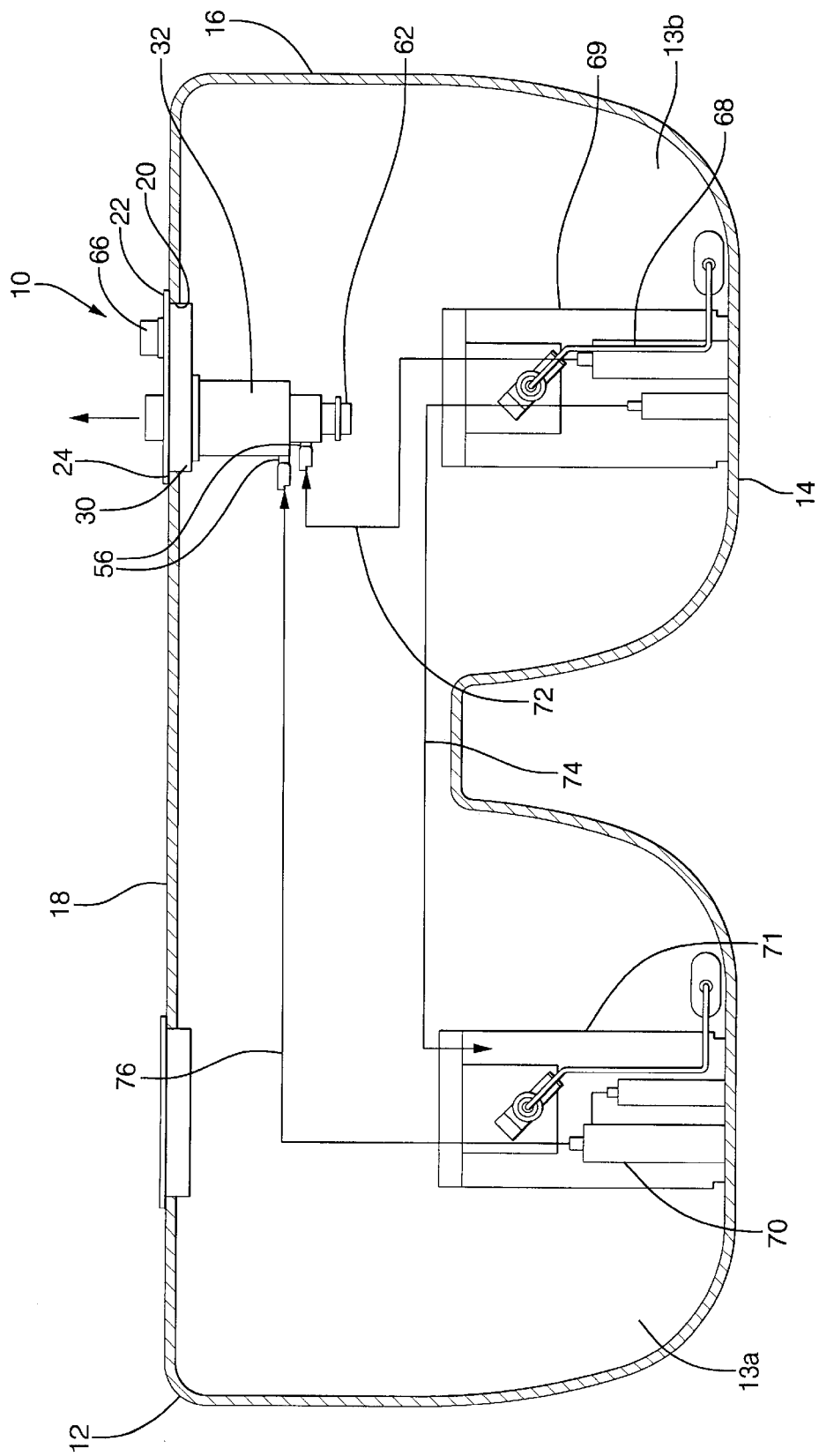
FIG. 1 is a fragmentary elevational view of a fuel tank cover and fuel filter assembly, according to the present invention, illustrated in operational relationship with a fuel tank.
Figure 2:
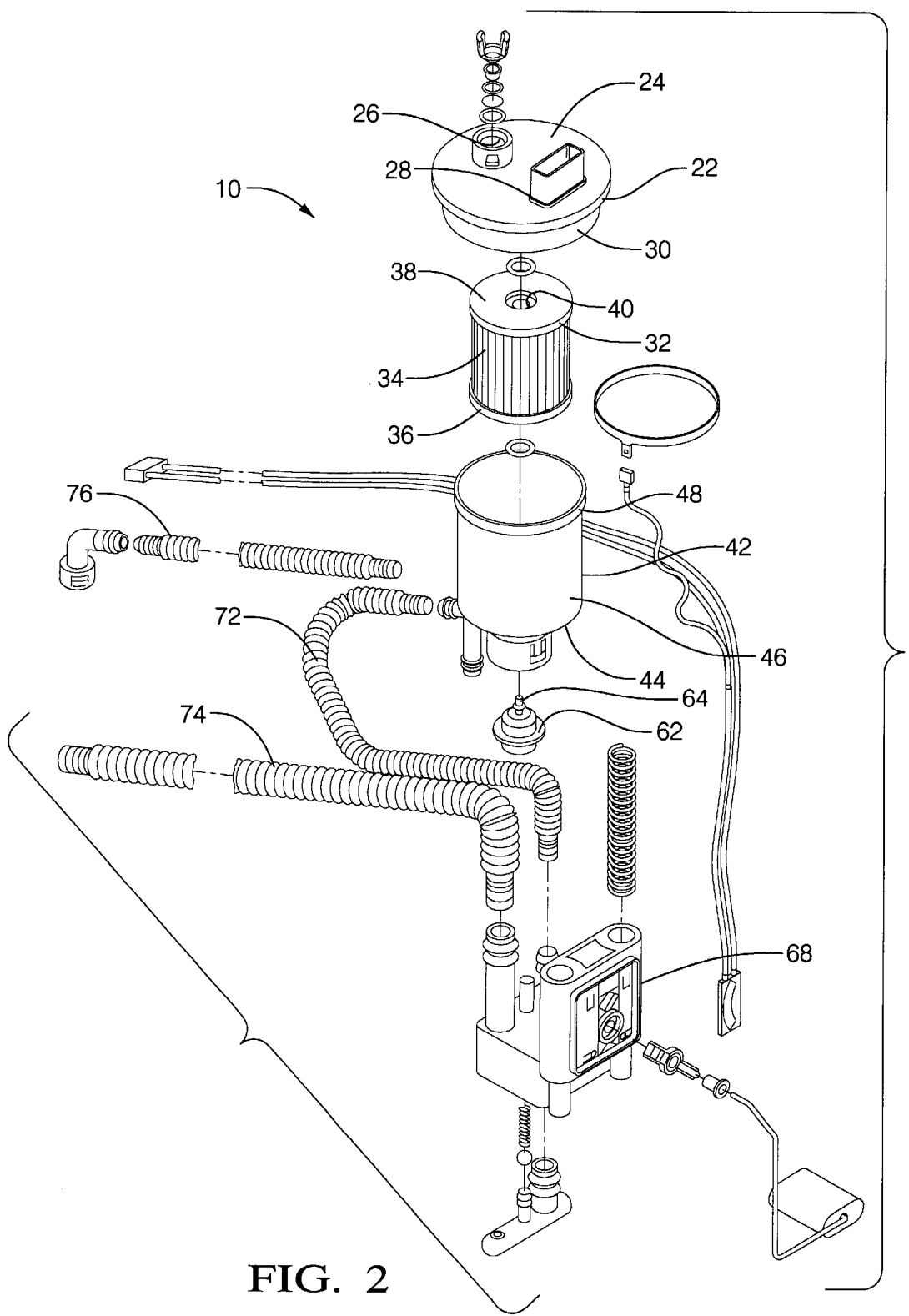
FIG. 2 is an exploded perspective view of the fuel tank cover and fuel filter assembly of FIG. 1.

Referring to the drawings and in particular FIGS. 1 and 2, one embodiment of a fuel tank cover and fuel filter assembly 10, according to the present invention, is shown for a fuel tank 12 of a vehicle (not shown). In this embodiment, the fuel tank 12 is of a saddle type having a primary tank portion 13a and an auxiliary tank portion 13b. The fuel tank 12 has a bottom wall 14 and a side wall 16 around a periphery of the bottom wall 14 and extending generally perpendicular thereto. The fuel tank 12 also has a top wall 18 around a periphery of the side wall 16 and extending generally perpendicular thereto. The fuel tank 12 is made of a rigid material such as plastic. The top wall 18 includes at least one opening 20 for the fuel tank cover and fuel filter assembly 10. It should be appreciated that, except for the fuel tank cover and fuel filter assembly 10, the fuel tank 12 is conventional and known in the art.

Figure 3:
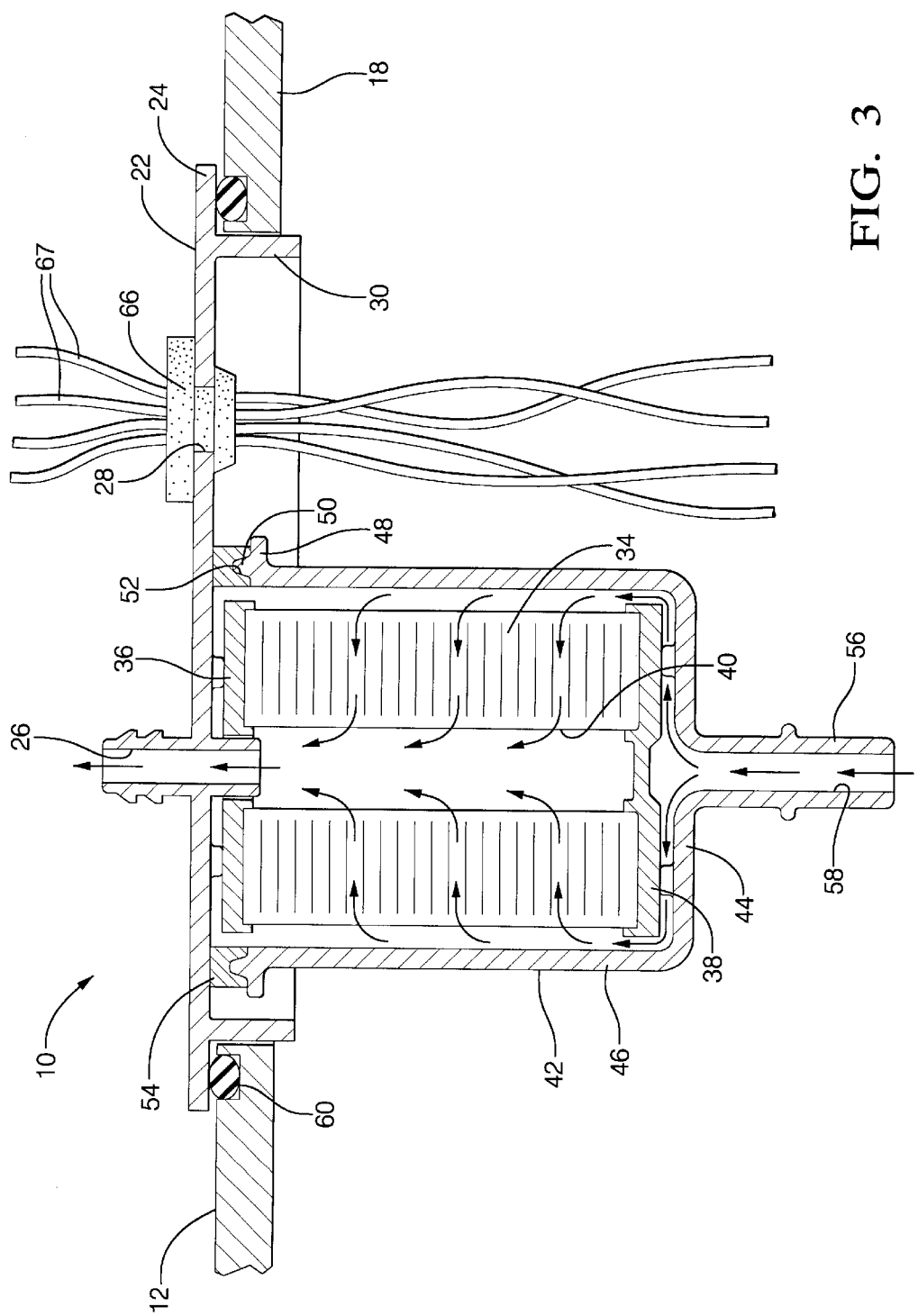
FIG. 3 is a fragmentary elevational view of the fuel tank cover and fuel filter assembly of FIG. 1.

Referring to FIGS. 1 through 3, the fuel tank cover and fuel filter assembly 10 includes a cover 22 to cover or close the opening 20. The cover 22 is generally circular in shape. The cover 22 includes a base wall 24 having at least one, preferably a plurality of apertures 26 and 28 extending therethrough for a function to be described. The cover 22 also includes a side wall 30 extending generally perpendicular and axially from the base wall 24. The cover 32 is made from a rigid material such as plastic, which is conventional material known in the art.

The fuel tank cover and fuel filter assembly 10 also includes a fuel filter 32 disposed within and attached directly to the cover 22. The fuel filter 32 is generally cylindrical and circular in shape. The fuel filter 32 has a filter element or body 34 and a bottom wall 36 at a lower end and a top wall 38 at an upper end which are generally planar and circular in shape. The filter body 34, bottom wall 36, and top wall 38 have an aperture 40 extending axially therethrough. The top wall 38 is disposed adjacent the base wall 24 of the cover 22. The fuel filter 22 also includes a filter housing or shell 42 for housing the filter body 34. The filter shell 42 has a base wall 44 extending radially and being generally circular in shape. The filter shell 42 also has a side wall 46 extending generally perpendicular from the base wall 44. The side wall 46 also has a flange 48 extending generally perpendicular from a top end thereof. The flange 48 may include a projection 50 extending axially to be received in a groove 52 of an annular projection 54 on a lower surface of the cover 22. The projection 50 is attached to the projection 54 by suitable means such as spin-welding, which is a conventional process known in the art. The filter shell 42 may also include at least one tubular projection 56 extending axially from the base wall 44 for connection via a hose or fuel line 72,76 to a pump 68,70 to be described. The projection 56 includes a passageway 58 extending therethrough for fluid communication. The filter shell 42 is made from a plastic material such as a polyethylene. It should be appreciated that the filter shell 42 is a monolithic structure being integral, unitary and one-piece. It should also be appreciated that a seal 60 may be disposed between the base wall 24 of the cover 22 and the top wall 18 of the fuel tank 12.

The fuel tank cover and fuel filter assembly 10 may include a fuel pressure regulator 62 connected directly to the fuel filter 32. The fuel pressure regulator 62 is connected to the filter shell 42 by disposing a projection 64 on the fuel pressure regulator 62 in the passageway 58 of one of the projections 56 on the filter shell 42. The fuel tank cover and fuel filter assembly 10 may include an electrical connector 66 extending into and through the aperture 28. The electrical connector 66 may include electrical wires 67 extending therethrough for connection to a pump 68,70 or sensor (not shown) in the fuel tank 12. It should be appreciated that the electrical connector 66 is conventional and known in the art. It should also be appreciated that the functions of the fuel filter 32 and fuel pressure regulator 62 are accomplished using one single component to regulate and filter fuel inside the fuel tank 12.

The fuel tank 12 includes a by-pass fuel jet pump 68 of a fuel reservoir 69 disposed in the auxiliary portion 13b of the fuel tank 12. The fuel tank 12 may include a high-pressure fuel jet pump 70 of a fuel reservoir 71 disposed in the primary portion 13a of the fuel tank 12. The fuel tank 12 includes a first fuel line 72 connecting the by-pass fuel jet pump 68 to the fuel filter 32 of the fuel tank cover and fuel filter assembly 10 and may include a second fuel filter line 74 connecting the by-pass fuel jet pump 68 to the high-pressure fuel jet pump 70. The fuel tank 12 may include a third fuel line 76 interconnecting the high-pressure fuel jet pump 70 and the fuel filter 32 of the fuel tank cover and fuel filter assembly 10. It should be appreciated that the jet pumps 68 and 70 are conventional and known in the art.

In operation, fuel inside the fuel tank 12 is pumped by the by-pass fuel jet pump 68 directly to the pressure regulator 62 of the fuel tank cover and fuel filter assembly 10 and aspirated fuel is pumped by the by-pass fuel jet pump 68 to the high-pressure fuel jet pump 70. Fuel is also pumped by the high-pressure fuel jet pump 70 to the pressure regulator 62 of the fuel tank cover and fuel filter assembly 10. Fuel is filtered by the fuel filter 32 and passes through the aperture 26 of the cover 22 via a hose (not shown) to an engine (not shown) of the vehicle.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel tank cover and fuel filter assembly for a fuel tank of a vehicle comprising:

a first fuel reservoir adapted to be disposed in the fuel tank;

a second fuel reservoir adapted to be disposed in the fuel tank;

a cover adapted to close an opening in the fuel tank;

a fuel filter adapted to be disposed within the fuel tank and comprising a filter shell and a filter body disposed inside said filter shell, said filter shell being attached directly to said cover, said fuel filter being adapted to filter fuel from the fuel tank to an engine of the vehicle; and a fuel pressure regulator adapted to be disposed within the fuel tank and disposed outside of said filter shell, said fuel pressure regulator being connected directly to a bottom of said filter shell and fluidly connected to said first fuel reservoir and said second fuel reservoir to regulate fuel inside the fuel tank.

2. A fuel tank cover and fuel filter assembly as set forth in claim 1 wherein said cover is made of a plastic material.

3. A fuel tank cover and fuel filter assembly as set forth in claim 1 wherein said filter shell is made of a plastic material and spin-welded to said cover.

4. A fuel tank cover and fuel filter assembly as set forth in claim 1 wherein said filter shell has a base wall and a side wall extending from said base wall.

5. A fuel tank cover and fuel filter assembly as set forth in claim 4 wherein said filter shell includes a flange extending outwardly from said side wall and connected to said cover.

6. A fuel tank cover and fuel filter assembly as set forth in claim 4 wherein said filter shell includes a projection extending axially from said base wall.

7. A fuel tank cover and fuel filter assembly as set forth in claim 1 wherein said cover comprises a base wall and a side wall extending perpendicular from said base wall.

8. A fuel tank cover and fuel filter assembly as set forth in claim 2 wherein said filter shell is integral, unitary and one-piece.

9. A fuel tank cover and fuel filter assembly for a fuel tank of a vehicle comprising:

a first fuel reservoir adapted to be disposed in the fuel tank;

a second fuel reservoir adapted to be disposed in the fuel tank;

a plastic cover adapted to close an opening in the fuel tank;

a fuel filter adapted to be disposed in the fuel tank and including a filter shell made of a plastic material and spin-welded to said cover, said fuel filter being adapted to filter fuel from the fuel tank to an engine of the vehicle; and a fuel pressure regulator adapted to be disposed within the fuel tank and disposed outside of said filter shell, said fuel pressure regulator being connected directly to a bottom of said filter shell and fluidly connected to said first fuel reservoir and said second fuel reservoir to regulate fuel inside the fuel tank.

10. A fuel tank cover and fuel filter assembly as set forth in claim 9 wherein said fuel filter includes a filter body disposed inside said filter shell.

11. A fuel tank cover and fuel filter assembly as set forth in claim 9 wherein said filter shell has a base wall and a side wall extending from said base wall.

12. A fuel tank cover and fuel filter assembly as set forth in claim 11 wherein said filter shell includes a projection extending axially from said base wall.

13. A fuel tank cover and fuel filter assembly as set forth in claim 12 wherein said fuel pressure regulator is connected to said projection of said filter shell.

14. A fuel tank cover and fuel filter assembly as set forth in claim 11 wherein said filter shell includes a flange extending outwardly from said side wall and connected to said cover.

15. A fuel tank cover and fuel filter assembly as set forth in claim 11 wherein said filter shell is integral, unitary and one-piece.

16. A fuel tank for a vehicle comprising:

a fuel tank having an opening formed in a wall thereof;

a first fuel reservoir adapted to be disposed in the fuel tank;

a second fuel reservoir adapted to be disposed in the fuel tank;

a fuel tank cover and fuel filter assembly to close said opening;

wherein said fuel tank cover and fuel filter assembly comprises a cover connected to said wall and a fuel filter disposed within said fuel tank and comprising a filter shell and a filter body disposed inside said filter shell, said filter shell being attached directly to said cover, said fuel filter being adapted to filter fuel from the fuel tank to an engine of the vehicle; and a fuel pressure regulator adapted to be disposed within the fuel tank and disposed outside of said filter shell, said fuel pressure regulator being connected directly to a bottom of said filter shell and fluidly connected to said first fuel reservoir and said second fuel reservoir to regulate fuel inside the fuel tank.

* * * * *